INVENTOR.
Walter Wanielista
BY
Hill, Sherman, Meroni, Gross & Simpson
ATTORNEYS

INVENTOR.
Walter Wanielista
BY
ATTORNEYS

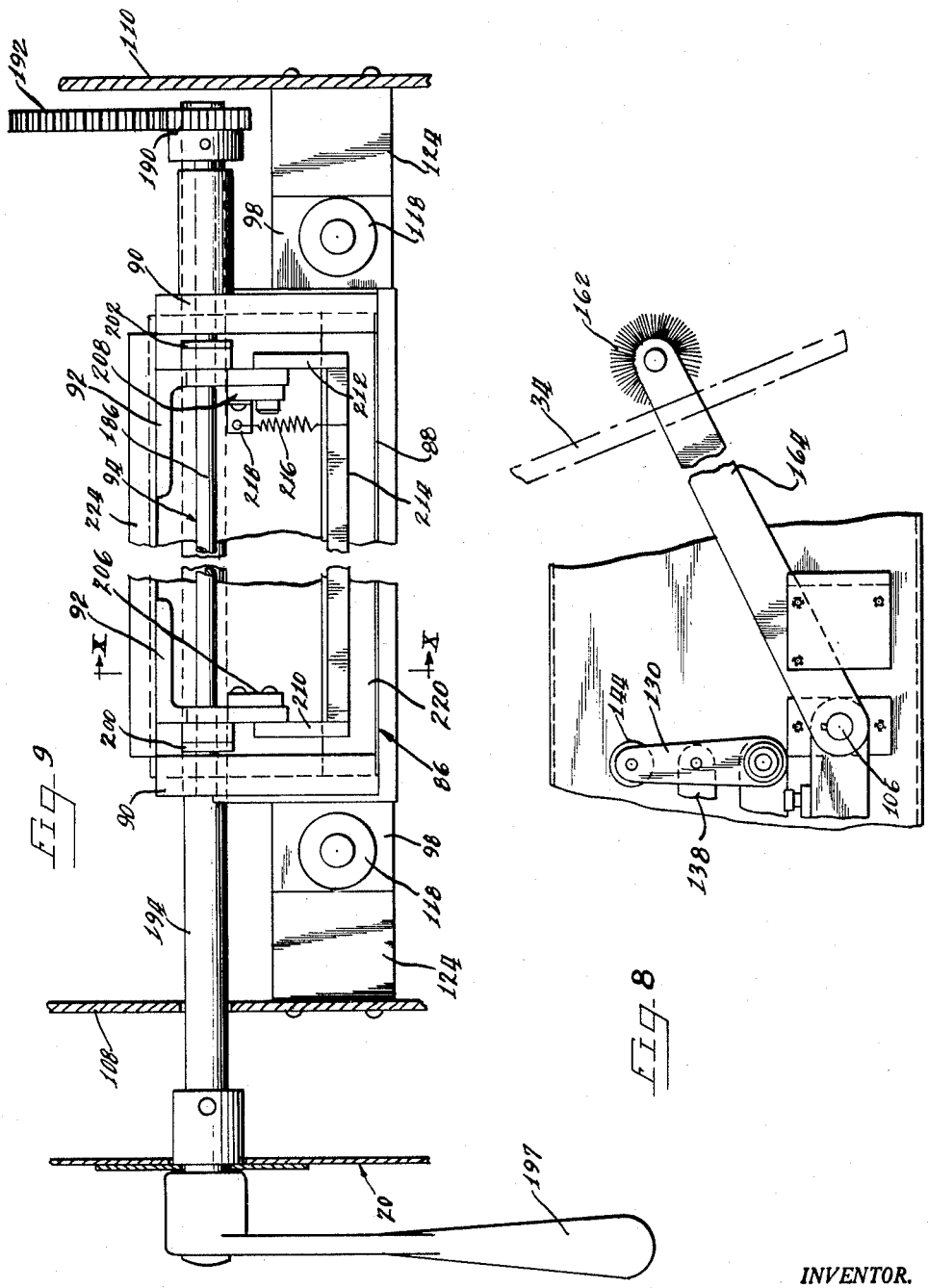

United States Patent Office 3,153,601
Patented Oct. 20, 1964

3,153,601
VERTICALLY MOVABLE BRUSH ASSEMBLY FOR AN ELECTROSTATIC CAMERA PROCESSOR
Walter Wanielista, Westchester, Ill., assignor to Robertson Photo-Mechanix, Inc., Chicago, Ill., a corporation of Illinois
Filed July 6, 1961, Ser. No. 122,325
23 Claims. (Cl. 118—8)

This invention relates generally to an electrostatic reproducing apparatus and more specifically to an xerographic brush apparatus which is adjustably or movably mounted for movement between an operating position for engagement of the brush with an image bearing member carried by a transporting device and a position providing clearance when the transporting device is reciprocated back to an initial position thereof.

In transporting materials such as sensitized sheet articles for photographic purposes or image bearing members for producing lithographic masters by xerographic processes, vacuum platen means may be used to transport the sheet form materials through a treatment zone such as is provided by an xerographic brush. In automating the treatment process by reciprocating the platen through an operating cycle, a problem is encountered in returning the vacuum platen to the pick-up position without contacting the treatment means. For example, in xerographic processes, an image thereon is passed into brushing contact with a rotating brush of toner and magnetizable filings for depositing the toner on the image bearing member. Thereafter, the platen transports the image bearing member to a release position and returns to the pick-up position, and it is desirable to prevent deposit of mixture on the platen during the return phase of the cycle. Further, a problem exists in providing suitable means for supplying a trough for the xerographic brush with the developer mixture of toner and magnetizable particles, or the like, while permitting the described reciprocating movement of the vacuum platen.

The present invention overcomes these problems by utilizing a vacuum platen assembly which is reciprocable on track means therefor, and in a forward direction of travel passes the charged image bearing member into operative relation with the treatment means such as an xerographic brush, while in the return direction of travel effecting camming of the treatment means and associated supply means out of operative relation to the platen. To this end, a pivotal mounting is provided for the treatment means and supply means, and these means are spring biased into elevated position, which is maintained by bypass means in one direction of travel of the vacuum platen assembly, with the bypass means depressing the treatment and supply means in the other direction of travel of the assembly.

Accordingly, it is an object of the present invention to provide a reciprocable vacuum platen for carrying sheet form materials such as sensitized paper or lithographic masters through a treatment zone and for camming treatment means of a treatment zone out of operative relation with the platen at such time as a return phase of the platen cycle occurs.

Another object of the invention is to provide apparatus as described wherein the treatment means is carried on a frame which is pivotal by cam means associated with the vacuum platen carriage, but which maintains its position in operative relation to the platen as the platen carries paper forwardly thereover while being relatively vertically depressible on return of the platen.

Another object of the invention is to provide apparatus as described wherein a supply means is pivotally mounted on a frame with the treatment means and includes means for supplying treatment materials such as developer mixture, to the treatment means.

Another object of the invention is to provide supply means as described, including a trough having an actuator bar journalled therein and a dispensing bar actuated by the actuator bar to dispense materials to the treatment means and to a trough therefor, with the actuator bar being operable by a manually rotatable shaft carried on the pivotal frame.

Another object of the invention is to provide platen clearing means pivotal into operative relation with the platen upon pivoting of the supply and treatment means as described.

Another object of the invention is to provide apparatus for processing sheet materials and the like, which is automatic, efficient, and operates with a positive action to assure effective treatment and continuous cycling of the device.

Other objects and advantages of the invention will become apparent as the description proceeds in accordance with the drawings, in which:

FIGURE 5a is a fragmentary cross-sectional view taken on line Va—Va of FIGURE 5;

FIGURE 8 is a fragmentary view of a portion of the structure shown in FIGURE 6 and including means for automatically and synchronously wiping the platen at the release position of the platen;

FIGURE 9 is a vertical sectional view, partly broken away, of supply means for the treatment means of the invention;

FIGURE 10 is a vertical sectional view taken along lines X—X of FIGURE 9; and

FIGURE 11 is a schematic view of an alternate form of supply means for the treatment means of the invention.

Figure 1:
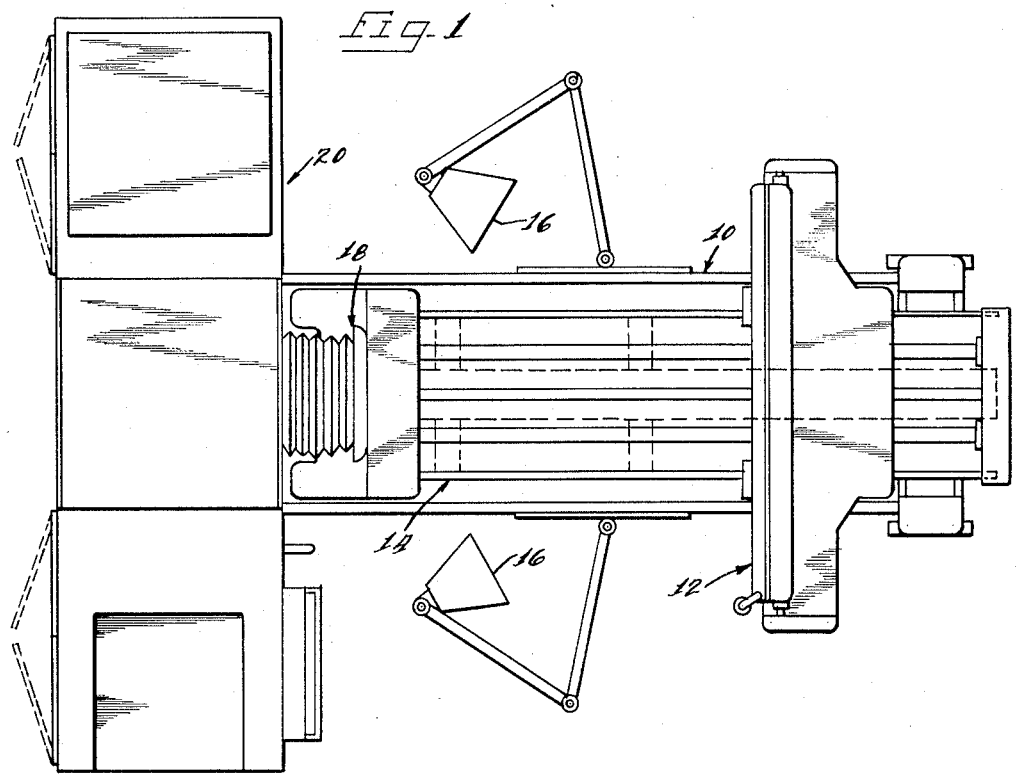
FIGURE 1 is a top plan view of reproducing apparatus with which the cycling and treatment apparatus of the invention may be utilized.

Referring now to the drawings, the processing apparatus and treatment means of the invention may be used in reproducing apparatus such as is illustrated in FIGURE 1 and designated generally by reference numeral 10. In the embodiment shown, the apparatus 10 is an electrostatic camera processer having a copyboard 12 movable on a track 14 and illuminated by lights 16 of any suitable type, to position an object for transmission of an image through the lens system of a camera structure 18 for focusing at an exposure position in an exposure and processing mechanism 20. The mechanism 20 of the electrostatic camera processer affords pick up of sheets for lithographic master making and carrying a photoconductive material charged by a corona charging means for receiving an image directed upwardly within the processing and exposure mechanism 20, whereby to effect a reaction in the sheet articles as carried by a movable platen assembly 22.

For this purpose, parallel tracks 24 and 26 are mounted on opposite sides of the housing for the mechanism 20, or otherwise suitably supported in horizontal, spaced apart relationship. The tracks are preferably of a cross-sectionally U-shaped configuration and are provided with upper and lower flanges such as the flanges 28 and 30 formed integrally therewith, and in laterally spaced relationship to the back wall 32 of the tracks.

The vacuum platen assembly 22 also includes a vacuum platen 34, a carriage 36, elongated camming and support bars 38 and 40 suitably mounted on the carriage 36 in parallel relationship thereto, and wheels 42, 44 and 46, 48 journaled on the support and camming bars 38 and 40 and recessed to track within the flanges such as the flanges 28 and 30 of the tracks 24 and 26.

The vacuum platen 34 is pivotally mounted on the carriage 36 by hinge means 50 and 52, as also hereinafter further described, and is normally maintained in a predetermined, preferably parallel relationship to the carriage 36, by locking means 54. The locking means 54 includes a cam or the like 56 for camming engagement with a cam 58 mounted in the housing of machine 20 and positioned to unlock the locking means 54 and to release the vacuum platen 34 for guided pivotal movement as effected by a cam means 59 which is mounted on the housing to engage a roller or the like 60 carried by the vacuum platen 34. The vacuum platen 34 also carries a spring biased release mechanism 63 for initiating release of sheet form material carried by the platen on the under surface thereof when the platen has been tilted, or otherwise.

In accordance with the invention, means are provided for applying a vacuum to the vacuum platen 34 for carrying material on the under surface thereof, including a flexible conduit 64 which may communicate with passages in the platen and apertures on the under surface thereof (not shown) and flexible conduit 66 communicating with the conduit 64 through a passage 68 in the carriage 36. It will be seen that the platen 34 may be reciprocated along the tracks 24 and 26 by any suitable means (not shown), as for example by actuating mechanism connected to an extension 70 on the carriage or otherwise.

In the art of xerography or electrostatic printing, a reproduction image is utilized which takes the form of a latent electrostatic charge image forming a magnetic pattern on a suitable photoconductive sheet member. Application of a developer mixture as described to the image bearing member serves to develop this latent image. Typically, developer mixtures include a so-called toner powder or developer powder with magnetizable particles such as iron filings or the like interspersed therewith.

In order to deposit the developer mixture on a latent-image bearing member, after the image has been received from the camera, a treatment means is provided for rotatably passing a brush of developer mixture into contact with the latent-image bearing member and a supply of the developer mixture is provided from supply means as hereinafter set forth. Accordingly, a treatment means as described is utilized as designated generally by reference numeral 72 and which is effective to coact with the platen 34 to present the developer mixture to a sheet on the under surface of the platen during forward movement of the platen, and, in accordance with the invention, to cooperate with the support and camming bars 38 and 40 in preventing deposit of developer mixture on the platen in a reverse or rearward direction of the platen.

The treatment means 72 may include a trough 74 establishing a presentation zone in which developer mixture is presented to the sensitized sheet material carried by the platen 34. The trough 74 may be mounted on supports 76 on each side thereof and joined by base 78. In order to transmit the developer mixture or treatment material to the sheet article carried by the platen, a cylindrical sleeve member 80 of non-magnetic material is journaled in the supports 76 and is driven by gear means as hereinafter further described. Magnetic means (not shown) forming separately rotatable core means are utilized within the non-magnetic cylinder or sleeve 80 and the mixture of developer is supplied to the non-magnetic sleeve from a source of supply in the trough 74, through which the sleeve 80 is rotated. In operation, therefore, the non-magnetic surface or sleeve 80 is sequentially passed through the mixture and toward the presentation zone as described, for brushing contact with the image bearing member. After such brushing contact, brush-like tufts or streamers on the sleeve or cylinder 80 are readily and conveniently removed to a predetermined depth by scraper means as also hereinafter set forth, so that the nonmagnetic surface may be conditioned to take on a new supply of mixture of the desired proportion of toner and magnetizable filings. Thus a doctor blade 82 and scraper blade 84 may be secured across the supports 76 to control the deposit of treatment material on the cylindrical member 80.

In order to supply treatment material to the trough 74, a supply means 86 is provided which may include a trough 88 mounted on supports 90 and having flanges 92 connected to the trough 74, and selectively operable dispensing means 94 journalled in the supports 90 and flanges 92, also as hereinafter further described. The supports 90 may be joined by a base 96 having extensions 98 at either end thereof.

In order to position the treatment means 72 in operative relation to the vacuum platen and a sheet of material carried thereby during forward movement of the platen, and to position the means 72 in inoperative position to the platen during return movement of the platen, as when the sheet material on the platen has been removed, the treatment means 72 as well as the supply means 86 are supported on a plurality of pivotal members such as the bars 100, 102 and 104, which are fixedly secured to a pivot shaft 106 journalled in side walls 108 and 110 of the housing for the processing mechanism 20. The tracks 24 and 26 are also secured to the side walls 108 and 110 by suitable means (not shown) so as to extend in parallel relation at a predetermined elevation above the shaft 106.

In order to resiliently urge the bars 100, 102 and 104 to a position such as to cause the cylinder 80 to present the treatment material to the sheet carried by the platen 34 during the said forward movement of the platen, spring means, generally indicated by reference numerals 112 and 114, are mounted on the base 116 of the housing and preferably bear against the base 96 for the supply means 86. The spring means 112 and 114 may be helical structures having considerable resistance to compression, and to provide a limit for the upward movement of the treatment means 72 and the supply means 86, the extensions 98 may engage stop elements 118 in their uppermost positions. The stop elements 118 may include relatively wide stop heads 120 mounted on bolt members 122 adjustably supported on brackets 124, with the brackets 124 extending inwardly from the sides 108 and 110 of the housing. Thus suitable nut elements 126 may be disposed on each side of the brackets 124 to vary the elevation of the stop heads 118 and adjustably determine the uppermost position of the treatment means 72.

The horizontally extending support bar and camming member 38 carried by the carriage 36 constitutes means for depressing an elongated bar 127 also fixedly secured to the shaft 106 in parallel with the bars 100, 102 and 104 carrying the treatment means 72 and supply means 86, and therefore, camming surfaces 128 are formed at the lower opposite ends of the bar 38, in the example shown.

Means for permitting movement of the carriage 36 in the forward direction without depressing or pivoting the bars 100, 102 and 104 downwardly, while coacting with the support and camming bars 38 and 40 to pivot the bars 100, 102 and 104 downwardly in the return direction thereof, thus constitute an important feature of the invention. To provide such means, a pair of crank arms 130 and 132 are pivotally mounted in longitudinally spaced relation on brackets 134 and 136 on the wall 108, for example, and are interconnected intermediate their ends by a link bar 138, pivotally secured thereto by studs 140 and 142 or the like. The upper ends of the crank arms 130 and 132 carry rollers or other cam means 144 and 146, respectively. The crank arm 132 has fixedly and preferably integrally connected thereto a crank arm 148 so that the arms 132 and 148 together form a bell crank, and in order to urge the arm 132 thereof to an upright position and thus to urge the arm 130 to a correspondingly upright position via the link 138, a link 150 is pivotally secured to the end of the arm 148 and defines an axial lost-motion slot 152. The lost-motion slot 152 slidably receives a lug or stud member 154 fixedly secured to the end of the arm 127, in the example shown. A tension spring 156 is connected between the stud 154 and the upper end of the arm 148, as at a stud 158 joining the arm 148 to the link 150.

Thus it will be seen that in the normal position of the means for pivotally supporting the treatment means 72 and supply means 86, the spring 156 urges the arm 148 downwardly to the extent permitted by the lost motion slot 152 in the link 150. Thereby, an upright position of the arms 130 and 132 is afforded in the phase of the operation of the device wherein the bars 38 and 40 are out of contact with the rollers 144 and 146 on the said arms, so that the treatment means and supply means are correspondingly elevated, as urged by spring means 112 and 114.

However, when the bars 38 and 40 move forwardly or in a direction over the bars 100, 102 and 104 toward the shaft 106, the cam surface 128 at the forward end of the bar 38 contacts the roller 146 and as the roller rides down this cam surface during the continued forward movement of the platen, the arms 130 and 132 as linked by the link 138 are pivoted forwardly, or in a clockwise direction in the example shown. However, the lost motion slot 152 permits the link 150 to move upwardly and thus permits the arm 148 and the arm 132 to be rotated in the said clockwise direction without changing the position of the arms 100 to 104 and bar 127, or of the treatment means 72 and supply means 86. Once the arms 130 and 132 are in their forwardly pivoted position, the rollers 146 and 144 will ride underneath the bar 38, and the arms will be returned to their initial vertical position, after the passage thereover of the bar 38 and of the platen 34 and carriage 36.

Conversely, the return of the platen 34 and the carriage 36 effects a downwardly pivotal movement of the bars 100 to 104 and of the treatment means 72 and supply means 86, since the rearward cam surface 128 of bar 38 will then contact the roller 144 initially and will rotate the arms 130 and 132, as linked by the link 138, in a counterclockwise direction, in the example shown. Since the spring 156 pulls the link 150 into firm engagement with the stop stud 154, the pivotal movement of the crank arm 132 and the arm 148 fixedly connected therewith will be translated into a downwardly directed force through the arm 150 and against the outer or free end of the arm 127, in the example shown. The tracks 24 and 26 provide a firm engagement for the carriage 36 and for the support and camming bars 38 and 40 so that the resistance of the springs 112 and 114 is overcome and the entire treatment means and supply means are moved out of operative relationship with the vacuum platen 34 during its return travel.

Figure 2:
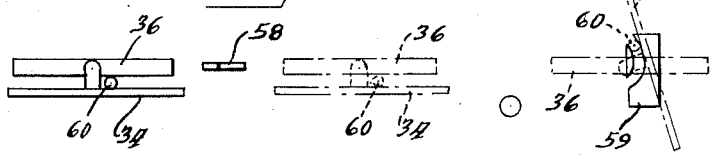
FIGURE 2 is a schematic representation of a vacuum platen and carriage of the invention, representing the movement of the platen into tilted position for removal of sheet material carried thereby.
Figure 3:
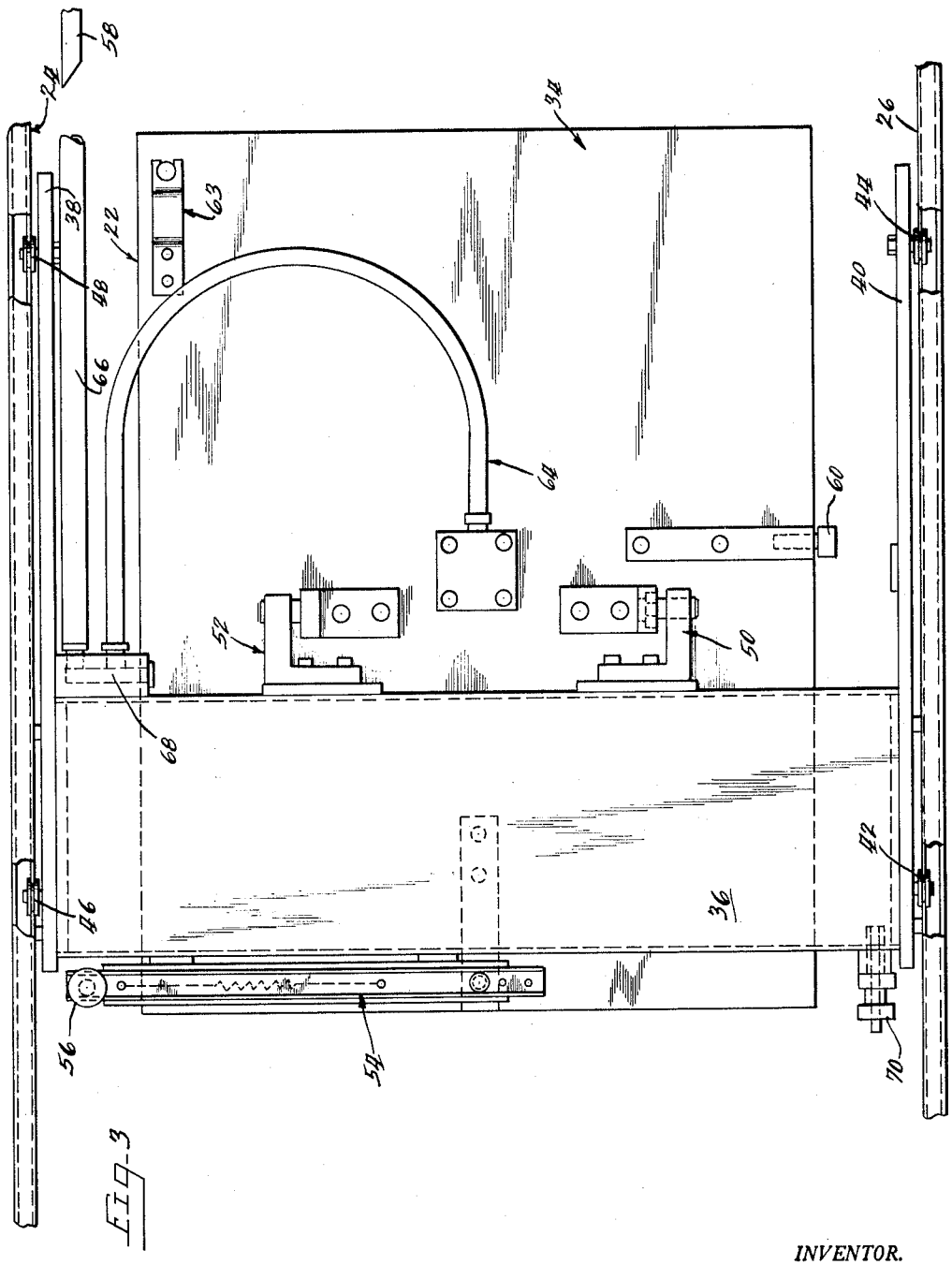
FIGURE 3 is a top plan view of the movable vacuum platen, carriage, and track means.
Figure 4:
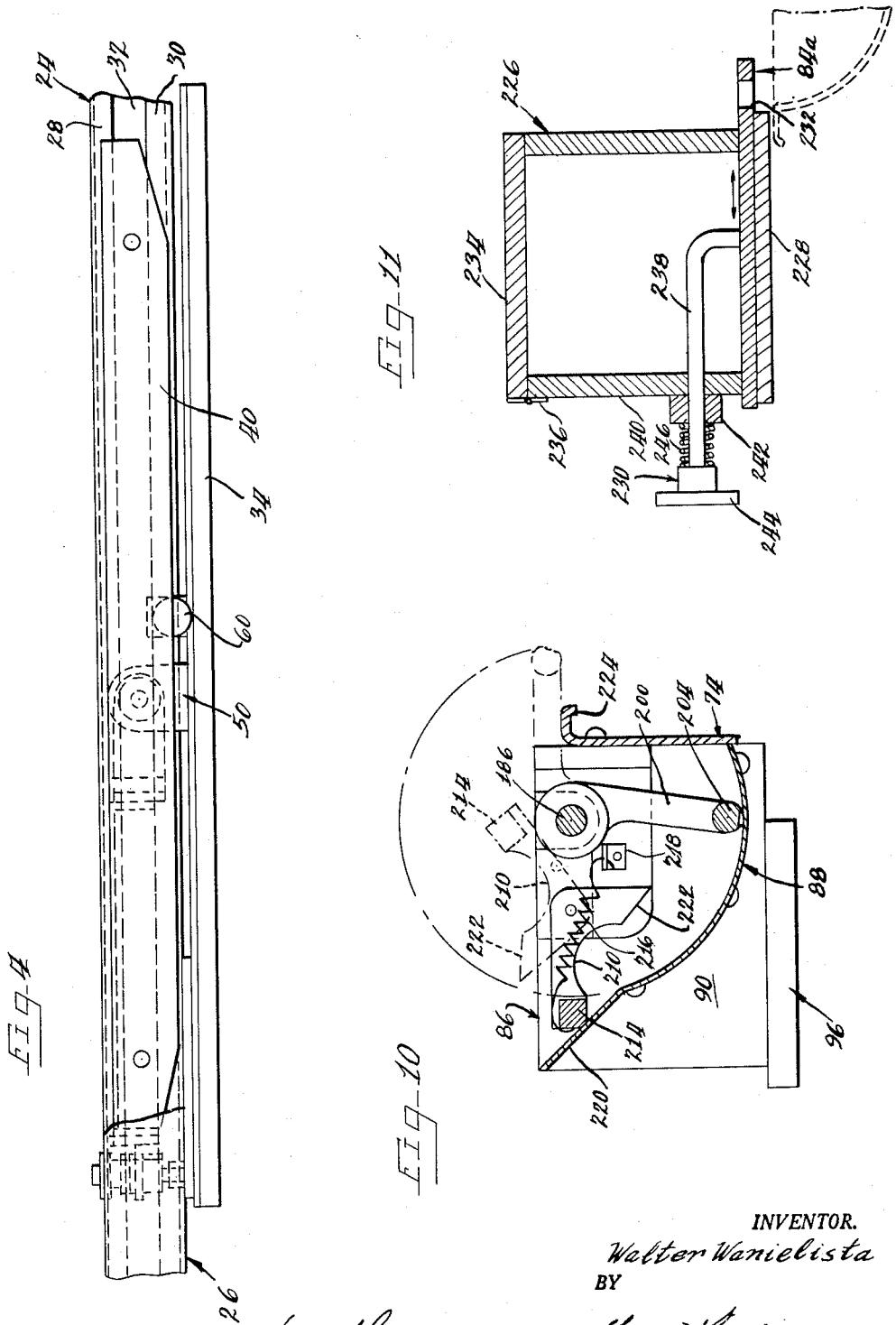
FIGURE 4 is a side elevational view, partly in vertical section and partly broken away, of the movable vacuum platen and carriage of the invention, in operative relation with track means therefor.

Referring now to FIGURES 2 and 8, the camming member 60 carried by the platen 34 is adapted to engage in the cam structure 59 when the cam member 56 has been cammed by a cam element 58 to release the latch means 54 and afford pivotal movement of the vacuum platen 34 around the hinges 50 and 52. Thus the vacuum platen is then pivoted upwardly into a position such as shown in the right hand section of FIGURE 2, to expose the sheet material carried thereby and afford removal thereof from the platen. At such time, it is, in specific circumstances, desirable to pass a cleaning element or the like automatically over the platen, and to this end, a cleaning brush structure or contact member 162 is mounted rotatably or otherwise on an elongated arm 164 fixedly secured to the shaft 106, as seen in FIGURE 8. Thereby, the actuation of the arm 164 and the brush 162 may be synchronized with the movement of the platen 34 into the tilted position shown in FIGURE 2. As the shaft 106 is rotated clockwise, in the example shown, upon return of the carriage 36, the arm 164 will be rotated upwardly to a corresponding extent and likewise the arm 164, with the brush 162, will move downwardly when the carriage and the support and camming bar 38 have passed over the roller 146.

Figure 5:
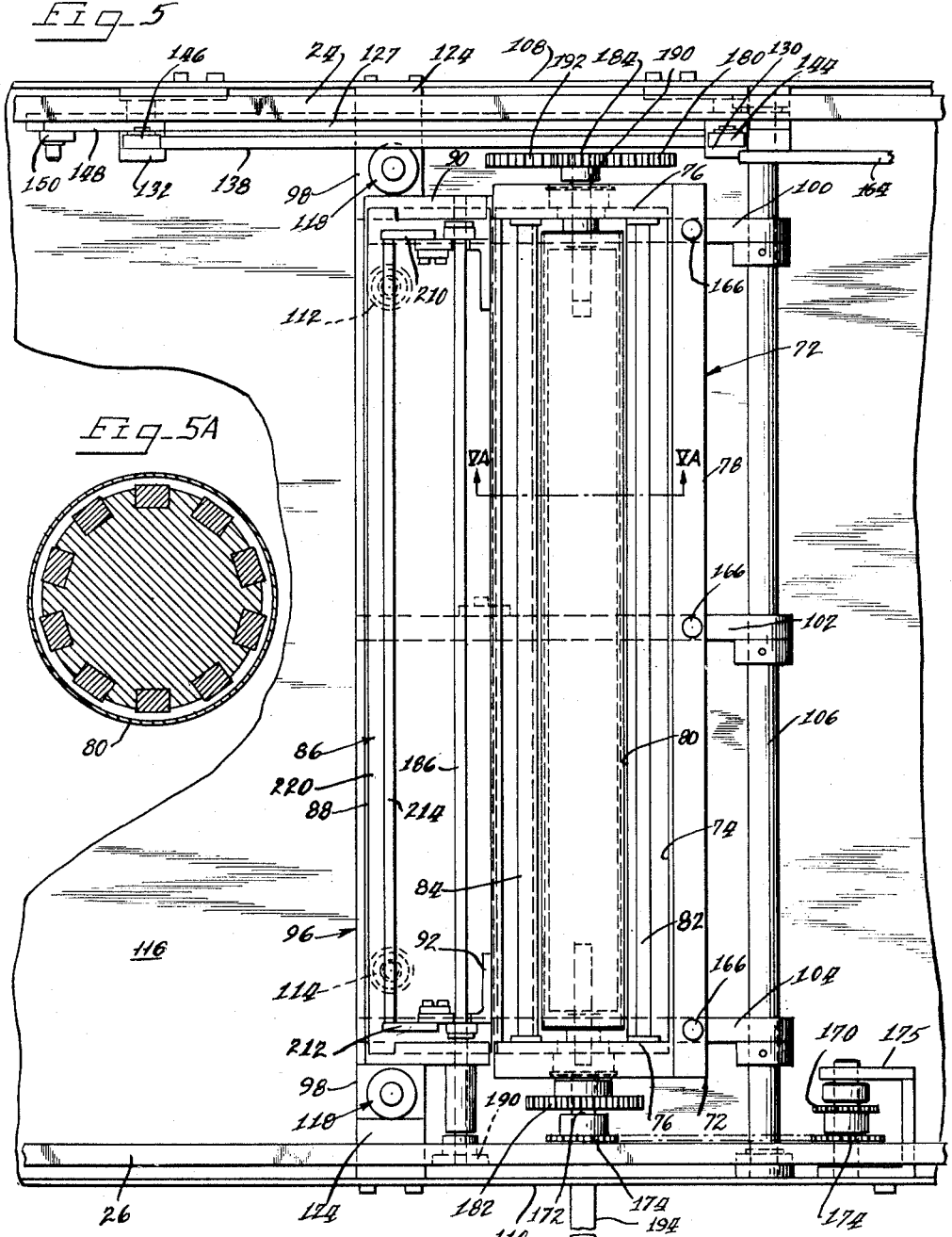
FIGURE 5 is a top plan view of treatment means according to the present invention.
Figure 6:
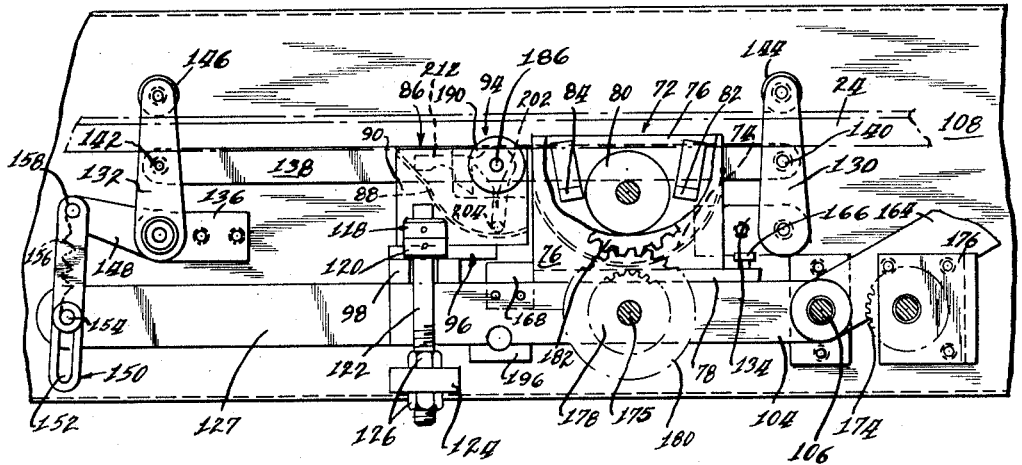
FIGURE 6 is a side elevational view, partly broken away, of the structure shown in FIGURE 5 and with the treatment means in operative position.
Figure 7:
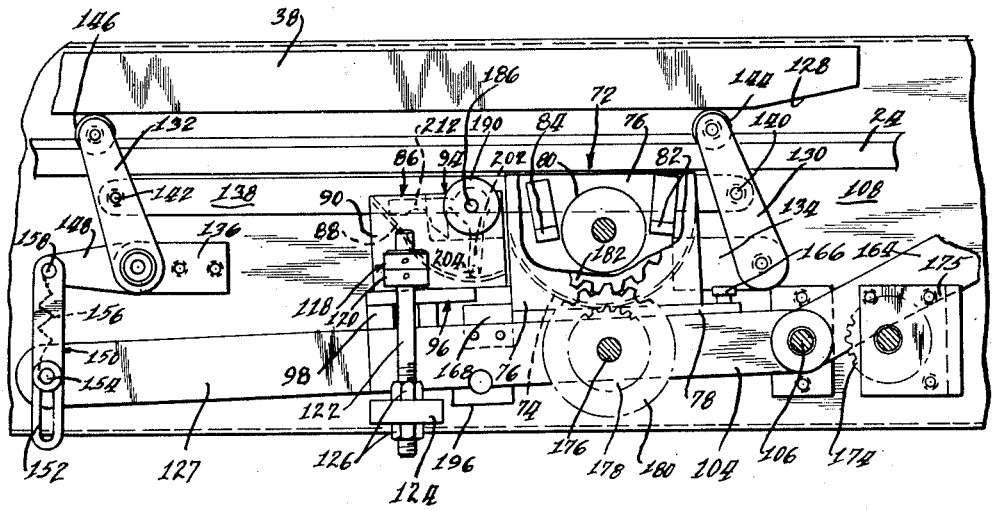
FIGURE 7 is a view corresponding to the view of FIGURE 6, but with the treatment means in inoperative position as cammed downwardly by cam means carried by the carriage of the vacuum platen.

Referring now to FIGURES 5, 6 and 7, the base 78 for the treatment means 72 may be secured to the arms 100, 102 and 104 by suitable means such as the studs 166 and suitable bracket and stud means 168 may be used to connect the base 96 for the supply means 86 to the stud bars 100 to 104. Other suitable connecting means for the base 96 may be used within the scope of the invention as, for example, depending studs for substantial length (not shown) corresponding to the studs 166 for the base 70.

The drive means for the magnetic core means and the sleeve or cylinder 80 may, of course, vary in accordance with the particular drive characteristics desired, and with particular circumstances, and in the example shown, as seen in FIGURE 5, the sprocket 170 may be driven by chain means from a motor (not shown) and thereby, a drive sprocket 172 may be driven from a sprocket 174 coaxial with the sprocket 170. Thus the sprockets 170 and 174 may be mounted on a shaft journaled in bracket means 175 mounted on a side of the housing such as the side 110, while the sprocket 172 may be connected to a drive shaft 176 supporting gears 178 and 180 at opposite ends thereof, for driving gears 182 and 184 associated with the cylinder 80. The sleeve or cylinder 80, and the magnetic core means, as seen in FIGURE 5, for example, may be driven by differentially rotatable structure operable by the gears 182 and 184, respectively.

The drive shaft 176 may thus be journaled in the bars 100, 102 and 104, as illustrated in FIGURES 6 and 7. Thereby, the driving means as well as the treatment and supply means are movable in accordance with the movement of the carriage 36 and platen 34.

The supply means 86 for supplying treatment materials such as a developer mixture of toner powder and iron filings as described to the treatment means 72 and to the trough 74 thereo, includes a shaft 186 journaled in the support structure 90 and extending outwardly from one end of the trough 88 and the support structure. Because of the flowable characteristic of the developer mixture or powder it is necessary to provide a means for directing the material from the trough 88 which will overcome the problem inherent in the dispensing of such material and to this end a gear or pinion 190 is fixed to the outwardly extending end of the shaft 186 in order to afford a means of actuating snap-over, over-balanced supply bar means as hereinafter further described. The gear 190 in turn is selectively actuated by a sector gear 192 supported on a shaft 194 which is in turn carried by suitable journal means 196, as diagrammatically shown in FIGURES 6 and 7, in journalled relation on the base 96 for the support means 90. The shaft 194 is freely received in the housing for the mechanism 20 and in walls 108 and 110, and has a handle 197 secured thereto for selective turning of the shaft 194 and the sector gear 192.

In order to move the flowable mixture or powder from the bottom of the trough, and to concurrently stir the mixture for proper proportioning of the components thereof, the shaft 186 has fixedly secured thereto depending arms 200 and 202 which carry at their extremities a transverse notched actuator bar 204, the arms 200 and 202 having a length corresponding to the radius of the trough 88. Thus it will be seen that the trough 88 has a cross-sectionally segmental circular configuration for a major extent thereof whereby the actuator bar 204 may move in closely proximate relation to the bottom of the trough and overcome any tendency to an undesirable deposition of heavier particles at the bottom of the trough.

In order to dispense the flowable powder-like mixture from the trough 88 cooperatively with the bar 204, and to overcome the difficulties residing in the necessity for moving such flowable material upwardly and over to the trough 74, bracket elements 206 and 208 are secured to the inwardly extending arms of the flanges 92 and cooperate therewith to provide trunnions for a wiper device having arms 210 and 212, which have a generally L-shaped configuration. A transverse wiper bar 214 joins the arms 210 and 212 at their outermost extremities, and the wiper bar 214 may be substantially square across sectionally. As the notched bar 204 passes the wiper bar 214, excess material is removed. An over-center action for the bar 214 is provided by a spring 216 secured thereto and to a bracket 218 mounted on the support bracket 208, in the embodiment shown. The upper edge of the trough 88 is disposed upwardly and outwardly relative to the segmental-circular section of the trough as indicated by reference numeral 220, and the spring 216 normally causes the bar 214 to abut this upwardly and outwardly extending trough portion 220. The other ends of the arms 210 and 212 define cam surfaces, as indicated at 222 in FIGURE 10.

Accordingly, when it is desired to dispense powdered or flowable treatment material from the trough 88 into the trough 74, the handle 197 is pivoted downwardly, in the example shown, thereby rotating the gear 192, the gear 190 and the shaft 186, to move the bar 204 upwardly along the bottom of the trough 88 at the segmental circular portion thereof. Since the radius of the bar from its axis corresponds to the radius of the trough, this action of the bar 204 will be seen to be effective in dredging up bottom materials in the trough, to afford a thorough mixture of materials and also to move the materials upwardly adjacent the upwardly and outwardly extending section 220 of the trough 88. The bar 204 thus carries a supply of the materials in the notched surface thereof and upon the then horizontally disposed upper surface of the bar 214, and contacts the arms 210 and 212 to move them pivotally upwardly. The spring 216 is mounted so that after a predetermind extent of turning of the bar 214, an over-center position is reached and the bar is caused to snap forwardly, throwing the material carried thereon directly into the trough 74. An upper flange 224 on the trough 74 may provide a stop for the bar 204 and also reinforce the trough and maintain materials therein.

In the return direction of movement of the bar 204, which is accomplished reversely from the foregoing procedure, the bar encounters the cam surfaces 222 of the arms 210 and 212 and these arms are reversely pivoted, to return the bar 214 to the position shown in FIGURE 10 wherein the supply means 86 is again disposed in readiness for a further supply cycle. It will be appreciated that the wall of the trough 74 limits the return movement of the arm 204, although, in this respect as well as with respect to the outward movement of the arm, it will be understood that various relationships may be utilized in providing a limit for the motion of the said arm 204.

Referring now to FIGURE 11, another dispensing and supply embodiment is shown wherein a scraper or stripper blade may be formed as the bottom wall of a supply dispenser 226, the scraper or stripper blade being designated therein by reference numeral 84a. A platform or the like 228 slidably supports the blade 84a in position to selectively overlie the trough 74, in an extended position of the blade, and to be retracted from the trough. The platform 228 may have its forward edge substantially coterminous with the flange 224, although of course, other dimensional configurations may be employed in this connection. The container 226 is preferably a generally rectangular box-like construction with end walls (not shown) connected to the platform 228 so that a slot is formed at least at the forward end of the box to permit the said slidable movement of the stripper blade 84a. An actuator 230 is provided for selectively sliding the stripper blade 84a forwardly into partially overlying relation to the trough 74 to replenish the material in the trough, and for this purpose, the stripper blade 84a defines a transverse slot 232 therein adjacent the forward edge adjacent to the trough 74.

The slot 232 is retracted within the housing or container 226 in the inoperative position of the device, and thereby receives a supply of the powdered or flowable treatment material therein. The top of the container 226 is provided with a cover 234 for replenishing the container with such material. A hinge or the like 236 pivotally connects the cover 234 to the front and rear walls of the container.

The actuating means 230 preferably includes an elongated stem 238 slidably received in an opening in the rear wall 240 of the container 226 and similarly sildably received in a stop 242 on the wall 240. The inner end of the stem 238 is turned downwardly and is fixedly secured to the stripper blade 84a rearwardly of the slot 232. The outer end of the stem has fixedly secured thereto a button or lever 244, which is biased outwardly by a spring 246 abutting at its other end the stop 242. In FIGURE 11, the device is shown in its operative position wherein the stripper blade 84a is disposed so that the slot 232 may deposit materials from within the container 226 into the trough 74. However, the spring 246 will serve to retract the blade 84a and to place the slot 232 within the box 226 as hereinabove described, so that the slot may again be filled with the treatment material.

Accordingly, manual actuation of the button 244 will slide the stripper blade 84a forwardly to release the material from the slot 232 and similarly and simultaneously the blade 84a may engage the cylinder 80 or be disposed in proximate relation thereto such as to strip off material carried thereon and precondition the cylinder for taking on a new supply of treatment material. Since the deposit of material from the slot 232 takes place simultaneously, the new supply in the trough 74 will be of a desired composition and the synchronization of the deposit of new material and stripping of old material from the cylinder 80 provides an advantageous feature of the invention. The stop 242 may cooperate with the button 230 and spring 246 to afford a predetermined limit to the outward movement of the stripper blade 84a such as to produce a desired coaction between the blade and the cylinder 80 for stripping material on the cylinder to a desired depth.

Accordingly, I have provided a treatment means and supply means therefor which may be used in conjunction with reproducing apparatus or other apparatus in a highly automatic fashion and without necessity for special skills in controlling the sequence of operations. Thus the treatment means 72 and the supply means 86 are automatically depressed vertically as the platen 34 is returned to a pick-up position but are positioned in operative relationship to the vacuum platen as the vacuum platen passes thereover in a forward direction to effect a treatment or conditioning of material carried on the platen.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. In a system for processing sheet articles and the like, a sheet carrying assembly, track means guiding said sheet carrying assembly through a predetermined path, cam means carried by said sheet carrying assembly, treatment means, supply means, means urging said treatment means and supply means to a predetermined position wherein said treatment means is adapted to condition a sheet article carried by said sheet carrying assembly and means responsive to said cam means maintaining said treatment means and supply means in said predetermined position during movement of said sheet carrying assembly therepast in one direction of travel and responsive to said cam means to move said treatment means and supply means out of said predetermined position to an inoperative position for said treatment means upon movement of said sheet carrying assembly in the opposite direction of travel.

2. In a system for processing sheet articles and the like, a sheet carrying assembly, track means guiding said sheet carrying assembly through a predetermined path, treatment means, supply means, means urging said treatment means and supply means to a predetermined position wherein said treatment means is adapted to condition a sheet article carried therepast in one direction by said sheet carrying assembly, cam means carried by said sheet-carrying assembly for selectively moving said treatment means and supply means out of said predetermined position to an inoperative position for said treatment means upon movement of said sheet carriage assembly in an opposite direction, and means carried by said supply means for selectively dispensing treatment material from said supply means to said treatment means.

3. A system for processing sheet articles or the like comprising a sheet carrying assembly, cam means on said sheet carrying assembly, track means guiding said sheet carrying assembly through a predetermined path, treatment means, means urging said treatment means to a predetermined position wherein said treatment means is adapted to be disposed in operative relation to a sheet article carried by said sheet carrying assembly, means permitting said treatment means to be maintained in said predetermined position when said sheet carrying assembly is moved in one direction past said treatment means and responsive to said cam means to move said treatment means out of said predetermined position and into inoperative relation with a sheet article carried by said sheet carrying assembly when said sheet carrying assembly is moved in the opposite direction and means actuated by said last named means for automatically wiping a sheet article carried by said sheet carrying assembly when said last named means is acted upon by said cam means.

4. A system for processing sheet material and the like comprising a sheet carrying assembly, track means for guiding said sheet carrying assembly along a predetermined path, said sheet carrying assembly including a carriage movable along said track means, a vacuum platen, means pivotally connecting said vacuum platen to said carriage, latch means releasably retaining said vacuum platen in predetermined relationship to said carriage, cam means releasing said latch means at a predetermined point of travel of said carriage along said track means, cam means controllably tilting said vacuum platen upon said release of said latch means, treatment means mounted for movement into and out of a predetermined operative position for conditioning a sheet carried by said vacuum platen during movement of said vacuum platen thereover, cam means carried by said carriage, means permitting said treatment means to remain in said predetermined position during movement of said vacuum platen over said treatment means in one direction and responsive to said cam means on said carriage to cam said treatment means out of said predetermined position during movement of said vacuum platen in the otherwise direction, and means connected to said means pivotally supporting said treatment means and acting on a lower surface of the vacuum platen when said treatment means is moved to said inoperative position.

5. A system for processing sheet material and the like comprising means for reciprocally transporting sheet material or the like through an operating cycle, track means guiding said means for transporting sheet material, cam means carried by said means for transporting sheet material, treatment means, means pivotally supporting said treatment means, a pair of arms pivotally mounted adjacent one side of said treatment means, a linkage member pivotally connecting said arms for corresponding angular movement, said means pivotally supporting said treatment means including an elongate bar, lost motion means joining one of said arms to said bar, said arms being pivoted by said cam means in one direction upon movement thereover of said cam means in said one direction with said lost motion means preventing pivotal movement of said bar and said means pivotally supporting said treatment means, and said arms pivotal in the opposite direction upon movement thereover of said cam means in said opposite direction to cause said lost motion means to pivot said bar and said means pivotally supporting said treatment means, whereby to move said treatment means to an inoperative position with respect to said means for transporting said sheet material or the like, and means urging said supporting means to position said means pivotally supporting said treatment means at a predetermined operative position for effecting treatment of sheet material carried thereover by said means for transporting sheet material.

6. A system for processing sheet material and the like comprising means for reciprocably transporting sheet material or the like through an operating cycle, track means guiding said means for transporting sheet material, cam means carried by said means for transporting sheet material, treatment means, means pivotally supporting said treatment means, a pair of arms pivotally mounted adjacent one side of said treatment means, a linkage member pivotally connecting said arms for corresponding angular movement, said means pivotally supporting said treatment means including an elongate bar, lost motion means joining one of said arms to said bar, said arms being pivoted by said cam means in one direction upon movement thereover of said cam means in said one direction with said lost motion means preventing pivotal movement of said bar and said means pivotally supporting said treatment means, and said arms being pivotal in the opposite direction upon movement thereover of said cam means in said opposite direction to cause said lost motion means to pivot said bar and said means pivotally supporting said treatment means, whereby to move said treatment means to an inoperative position with respect to said means for transporting said sheet material or the like, and means urging said supporting means to position said means pivotally supporting said treatment means at a predetermined operative position for effecting treatment of sheet material carried thereover by said means for transporting sheet material, said means urging said treatment means to a predetermined operative position including stop means engageable with said means pivotally supporting said treatment means.

7. A system for processing sheet material and the like comprising means for reciprocably transporting sheet material or the like through an operating cycle, track means guiding said means for transporting sheet material, cam means carried by said means for transporting sheet material, treatment means, means pivotally supporting said treatment means, a pair of arms pivotally mounted adjacent one side of said treatment means, a linkage member pivotally connecting said arms for corresponding angular movement, said means pivotally supporting said treatment means including an elongate bar, lost motion means joining one of said arms to said bar, said arms being pivoted by said cam means in one direction upon movement thereover of said cam means in said one direction with said lost motion means preventing pivotal movement of said bar and said means pivotally supporting said treatment means, and said arms being pivotal in the opposite direction upon movement thereover of said cam means in said opposite direction to cause said lost motion means to pivot said bar and said means pivotally supporting said treatment means, whereby to move said treatment means to an inoperative position with respect to said means for transporting said sheet material or the like, and means urging said supporting means to position said means pivotally supporting said treatment means at a predetermined operative position for effecting treatment of sheet material carried thereover by said means for transporting sheet material, said means urging said treatment means to a predetermined operative position including stop means engageable with said means pivotally supporting said treatment means, said stop means including means for adjusting the operative position of said treatment means.

8. A system for processing sheet material and the like comprising means for reciprocably transporting sheet material or the like through an operating cycle, track means guiding said means for transporting sheet material, cam means carried by said means for transporting sheet material, treatment means, means pivotally supporting said treatment means, a pair of arms pivotally mounted adjacent one side of said treatment means, a linkage member pivotally connecting said arms for corresponding angular movement, said means pivotally supporting said treatment means including an elongate bar, lost motion means joining one of said arms to said bar, said arms being pivoted by said cam means in said one direction with said lost motion means preventing pivotal movement of said bar and said means pivotally supporting said treatment means, and said arms being pivotal in the opposite direction upon movement thereover of said cam means in said opposite direction to cause said lost motion means to pivot said bar and said means pivotally supporting said treatment means, whereby to move said treatment means to an inoperative position with respect to said means for transporting said sheet material or the like, and means urging said supporting means to position said means pivotally supporting said treatment means at a predetermined operative position for effecting treatment of sheet material carried thereover by said means for transporting sheet material, said means urging said treatment means to a predetermined operative position including stop means engageable with said means pivotally supporting said treatment means, and said means pivotally supporting said treatment means including a shaft connected to said elongated bar for rotation with said bar, means journalling said shaft and an arm extending from said rotatable shaft and having means thereon for conditioning said means for transporting sheet material during rotation of said rotatable shaft.

9. A system for processing sheet material and the like comprising means for reciprocably transporting sheet material or the like through an operating cycle, track means guiding said means for transporting sheet material, cam means carried by said means for transporting sheet material, treatment means, means pivotally supporting said treatment means, a pair of arms pivotally mounted adjacent one side of said treatment means, a linkage member pivotally connecting said arms for corresponding angular movement, said means pivotally supporting said treatment means including an elongate bar, lost motion means joining one of said arms to said bar, said arms being pivoted by said cam means in one direction upon movement thereover of said cam means in said one direction with said lost motion means preventing pivotal movement of said bar and said means pivotally supporting said treatment means, and said arms being pivotal in the opposite direction upon movement thereover of said cam means in said opposite direction to cause said lost motion means to pivot said bar and said means pivotally supporting said treatment means, whereby to move said treatment means to an inoperative position with respect to said means for transporting said sheet material or the like, and means urging said supporting means to position said means pivotally supporting said treatment means at a predetermined operative position for effecting treatment of sheet material carried thereover by said means for transporting sheet material, said means urging said treatment means to a predetermined operative position including stop means engageable with said means pivotally supporting said treatment means, and said means pivotally supporting said treatment means including a shaft connected to said elongate bar and mounted for rotation with said bar, means journalling said shaft, a second elongated bar connected to said rotatable shaft in parallel with the first-mentioned elongated bar, a drive shaft journalled into said first and second elongated bars and means operatively connected with said drive shaft for operating said treatment means.

10. A system for processing sheet material and the like comprising means for reciprocably transporting sheet material or the like through an operating cycle, track means guiding said means for transporting sheet material, cam means carried by said means for transporting sheet material, treatment means, means pivotally supporting said treatment means, a pair of arms pivotally mounted adjacent one side of said treatment means, a linkage member pivotally connecting said arms for corresponding angular movement, said means pivotally supporting said treatment means including an elongated bar, lost motion means joining one of said arms to said bar, said arms being pivoted by said cam means in one direction upon movement thereover of said cam means in said one direction with said lost motion means preventing pivotal movement of said bar and said means pivotally supporting said treatment means, and said arms being pivotal in the opposite direction upon movement thereover of said cam means in said opposite direction to cause said lost motion means to pivot said bar and said means pivotally supporting said treatment means, whereby to move said treatment means to an inoperative position with respect to said means for transporting said sheet material or the like, and means urging said supporting means to position said treatment means at a predetermined operative position for effecting treatment of sheet material carried thereover by said means for transporting sheet material, said means urging said treatment means to a predetermined operative position including stop means engageable with said means pivotally supporting said treatment means, and said means pivotally supporting said treatment means including a shaft connected to said elongated bar and mounted for rotation with said bar, means journalling said shaft, a second elongated bar connected to said rotatable shaft in parallel with the first-mentioned elongated bar, a drive shaft journalled in said first and second elongated bars, and means operatively connected with said drive shaft for operating said treatment means including gear means on said drive shaft, said treatment means including a cylinder journalled in supported relation to said means supporting said treatment means and gear means for said cylinder meshing with said gear means on said drive shaft and rotating said cylinder.

11. In a system for processing sheet materials and the like, a sheet carrying assembly, track means guiding said sheet carrying assembly along a predetermined path, treatment means, supply means for said treatment means, means pivotally mounting said treatment and said supply means, means urging said means pivotally mounting said treatment means and said supply means to position said treatment means in operative relation to said means for carrying sheet material, cam means carried by said means for carrying sheet material and means responsive to said cam means for pivoting said means pivotally mounting said treatment means and said supply means into inoperative relation to said means for carrying sheet material in one direction of travel of said means for carrying sheet material, said supply means including manually rotatable means carried by said means pivotally mounting said treatment and supply means, a trough, means journalled in said trough for moving treatment material upwardly from the trough, over-center means moved from said trough by said rotatable means to dispense the treatment material to said treatment means with a snap action upon rotation of said rotatable means and cam means on said overcenter means returning said over-center means to said trough upon return rotational movement of said rotatable means to condition the supply means for supplying further materials as desired.

12. In a device for processing sheet materials or the like, and including treatment means and moveable means for carrying sheet materials to be conditioned by said treatment means, supply means for said treatment means including a trough, an actuator bar journalled in said trough, said trough having a radius of curvative along the bottom thereof corresponding to the radius of said actuator bar with respect to the journal axis thereof, a dispensing bar, L-shaped arms having cam surfaces and journalling said dispenser bar in said trough, spring means exerting tension force on said actuator bar to restrain said actuator bar through a predetermined arc and thereafter to effect a snap action of said actuator bar to cause said dispensing bar to direct treatment materials to the treatment means, a shaft journalled beneath said trough, a handle on one end of said shaft for rotating said shaft, gear means interconnecting said shaft with said actuator bar to pivot said actuator bar in response to rotation of said shaft, said actuator bar being effective to engage said cam surfaces to move said dispensing bar to snap over position and to return said dispensing bar to an initial position upon counter-rotation of said shaft.

13. In a device for processing sheet materials or the like, and including treatment means and movable means for carrying sheet materials to be conditioned by said treatment means, supply means for said treatment means including a trough, an actuator bar journalled in said trough, said trough having a radius of curature along the bottom thereof corresponding to the radius of said actuator bar with respect to the journal axis thereof, a dispensing bar, L-shaped arms having cam surfaces and journalling said dispenser bar in said trough, spring means exerting tension force on said actuator bar to restrain said actuator bar through a predetermined arc and thereafter to effect a snap action of said actuator bar to cause said dispensing bar to direct treatment materials to the treatment means, a shaft journalled beneath said trough, a handle on one end of said shaft for rotating said shaft, gear means interconnecting said shaft with said actuator bar to pivot said actuator bar in response to rotation of said shaft, said actuator bar being effective to engage said cam surfaces to move said dispensing bar to snap over position and to return said dispensing bar to an initial position upon counter-rotation of said shaft, said trough having a portion extending upwardly and outwardly on a side opposite said treatment means to engage said dispensing bar upon return of said dispensing bar to said initial position and to receive treatment materials during upward movement of said actuator bar.

14. In a device for processing sheet materials or the like, and including treatment means and movable means for carrying sheet materials to be conditioned by said treatment means, supply means for said treatment means including a trough, an actuator bar journalled in said trough, said trough having a radius of curvature along the bottom thereof corresponding to the radius of said actuator bar with respect to the journal axis thereof, a dispensing bar, L-shaped arms having cam surfaces and journalling said dispenser bar in said trough, spring means exerting tension force on said actuator bar to restrain said actuator bar through a predetermined arc and thereafter to effect a snap action of said actuator bar to cause said dispensing bar to direct treatment materials to the treatment means, a shaft journalled beneath said trough, a handle on one end of said shaft for rotating said shaft, gear means interconnecting said shaft with said actuator bar to pivot said actuator bar in response to rotation of said shaft, said actuator bar being effective to engage said cam surfaces to move said dispensing bar to snap over position and to return said dispensing bar to an initial position upon counter-rotation of said shaft, said trough having a portion extending upwardly and outwardly on a side opposite said treatment means to engage said dispensing bar upon return of said dispensing bar to said initial position and to receive treatment materials during upward movement of said actuator bar, each of said arms having one leg thereof connected to said dispensing bar and another leg thereof bevelled to engage said actuator bar upon said counter-rotation of said shaft.

15. In a system for processing sheet material and the like, a sheet carrying assembly comprising carriage, a pair of support members extending in parallel relation on opposite sides of said carriage, one of said support members having bevelled cam surfaces at opposite ends thereof, a pair of wheels on each of said support members, a track for each of said pairs of wheels, means supporting said tracks in parallel relationship to guide said carriage along a predetermined path, a sheet retentive platen on said carriage, treatment means, supply means for said treatment means, means pivotally supporting said treatment means and said supply means below said tracks and including a shaft journaled in said means supporting said tracks and an elongated bar extending perpendicularly from said shaft, a pair of arms pivotally mounted on said means supporting said tracks in register with said support member having cam surfaces thereon, a linkage member interconnecting said arms, one of said arms having an L-shaped configuration, a lost motion bar connected to the leg of said L-shaped arm and defining a lost motion slot, a pin on said elongated bar extending into said lost motion slot, spring means urging said lost motion bar downwardly against said pin, means urging said means supporting said treatment means and supply means upwardly and limit means coacting with said means supporting said treatment means and said supply means to normally maintain said treatment means in operative position to condition a sheet carried by said sheet retentive platen and to position said arms upwardly into intersecting relation with said support member having camming surfaces thereon, said tracks guiding said assembly and support members to turn said arms in one direction during movement of said assembly in one direction whereby the lost motion bar is moved upwardly and said pin is moved relatively downwardly in said lost motion slot to maintain said operative position of said treatment means and to turn said arms in the opposite direction during reverse movement of said assembly to move said lost motion bar downwardly, and thereby move said elongated bar and said supporting means for said treatment means and supply means downwardly, to position said treatment means in inoperative relationship with said sheet retentive platen.

16. In a system for processing sheet material and the like, a sheet carrying assembly comprising a carriage, a pair of support members extending in parallel relation on opposite sides of said carriage, one of said support members having bevelled cam surfaces at opposite ends thereof, a pair of wheels on each of said support members, a track for each of said pairs of wheels, means supporting said tracks in parallel relationship to guide said carriage along a predetermined path, a sheet retentive platen on said carriage, treatment means, supply means for said treatment means, means pivotally supporting said treatment means and said supply means below said tracks and including a shaft journalled in said means supporting said tracks and an elongated bar extending perpendicularly from said shaft, a pair of arms pivotally mounted on said means supporting said tracks in register with said support member having cam surfaces thereon, a linkage member interconnecting said arms, one of said arms having an L-shaped configuration, a lost motion bar connected to the leg of said L-shaped arm and defining a lost motion slot, a pin on said elongated bar extending into said lost motion slot, spring means urging said lost motion bar downwardly against said pin, means urging said means supporting said treatment means and supply means upwardly, limit means coacting with said means supporting said treatment means and said supply means to normally maintain said treatment means in operative position to condition a sheet carried by said sheet retentive platen and to position said arms upwardly into intersecting relation with said support member having camming surfaces thereon, said tracks guiding said assembly and support members to turn said arms in one direction during movement of said assembly in one direction whereby the lost motion bar is moved upwardly and said pin is moved relatively downwardly in said lost motion slot to maintain said operative position of said treatment means and to turn said arms in the opposite direction during reverse movement of said assembly to move said lost motion bar downwardly, and thereby move said elongated bar and said supporting means for said treatment means and supply means downwardly, to position said treatment means in inoperative relationship with said sheet retentive platen, a second elongated bar connected to said shaft extending parallel to said first elongated bar, a drive shaft journalled in said elongated bars, a gear on one end of said drive shaft, stationary drive means connected to said gear and affording relative movement of said gear and means in said treatment means rotated by said gear to effect rotating treatment contact with a sheet carried by said sheet retentive platen in the operative position of said treatment means.

17. In a system for processing sheet material and the like, a sheet carrying assembly comprising a carriage, a pair of support members extending in parallel relation on opposite sides of said carriage, one of said support members having bevelled cam surfaces at opposite ends thereof, a pair of wheels on each of said support members, a track for each of said pairs of wheels, means supporting said tracks in parallel relationship to guide said carriage along a predetermined path, a sheet retentive platen on said carriage, treatment means, supply means for said treatment means, means pivotally supporting said treatment means and said supply means below said tracks and including a shaft journalled in said means supporting said tracks and an elongated bar extending perpendicularly from said shaft, a pair of arms pivotally mounted on said means supporting said tracks in register with said support member having cam surfaces thereon, a linkage member interconnecting said arms, one of said arms having an L-shaped configuration, a lost motion bar connected to the leg of said L-shaped arm and defining a lost motion slot, a pin on said elongated bar extending into said lost motion slot, spring means urging said lost motion bar downwardly against said pin, means urging said means supporting said treatment means and supply means upwardly, limit means coacting with said means supporting said treatment means and said supply means to normally maintain said treatment means in operative position to condition a sheet carried by sheet retentive platen and to position said arms upwardly into intersecting relation with said support member having camming surfaces thereon, said tracks guiding said assembly and support members to turn said arms in one direction during movement of said assembly in one direction whereby the lost motion bar is moved upwardly and said pin is moved relatively downwardly in said lost motion slot to maintain said operative position of said treatment means and to turn said arms in the opposite direction during reverse movement of said assembly to move said lost motion bar downwardly, and thereby move said elongated bar and said supporting means for said treatment means of supply means downwardly, to position said treatment means in inoperative relationship with said sheet retentive platen, a second elongated bar connected to said shaft extending parallel to said first elongated bar, a drive shaft journalled in said elongated bars, a gear on one end of said drive shaft, stationary drive means connected to said gear and affording relative movement of said gear and means in said treatment means rotated by said gear to effect rotating treatment contact with a sheet carried by said sheet retentive platen in the operative position of said treatment means and a journalled shaft for said supply means having a manually operable handle and a sector gear, said supply means including a trough, a shaft journalled in said trough having a gear engaging with said sector gear and an actuator bar connected to said shaft journalled in said trough for movement of treatment materials in said trough.

18. In a system for processing sheet material and the like, a sheet carrying assembly comprising a carriage, a pair of support members extending in parallel relation on opposite sides of said carriage, one of said support members having bevelled cam surfaces at opposite ends thereof, a pair of wheels on each of said support members, a track for each of said pairs of wheels, means supporting said tracks in parallel relationship to guide said carriage along a predetermined path, a sheet retentive platen on said carriage, treatment means, supply means for said treatment means, means pivotally supporting said treatment means and said supply means below said tracks and including a shaft journalled in said means supporting said tracks and an elongated bar extending perpendicularly from said shaft, a pair of arms pivotally mounted on said means supporting said tracks in register with said support member having cam surfaces thereon, a linkage member interconnecting said arms, one of said arms having an L-shaped configuration, a lost motion bar connected to the leg of said L-shaped arm and defining a lost motion slot, a pin on said elongated bar extending into said lost motion slot, spring means urging said lost motion bar downwardly against said pin, means urging said means supporting said treatment means and supply means upwardly, limit means coacting with said means supporting said treatment means and said supply means to normally maintain said treatment means in operative position to condition a sheet carried by sheet retentive platen and to position said arms upwardly into intersecting relation with said support member having camming surfaces thereon, said tracks guiding said assembly and support members to turn said arms in one direction during movement of said assembly in one direction whereby the lost motion bar is moved upwardly and said pin is moved relatively downwardly in said lost motion slot to maintain said operative position of said treatment means and to turn said arms in the opposite direction during reverse movement of said assembly to move said lost motion bar downwardly, and thereby move said elongated bar and said supporting means for said treatment means of supply means downwardly, to position said treatment means in inoperative relationship with said sheet retentive platen, a second elongated bar connected to said shaft extending parallel to said first elongated bar, a drive shaft journalled in said elongated bars, a gear on one end of said drive shaft, stationary drive means connected to said gear and affording relative movement of said gear and means in said treatment means rotated by said gear to effect rotating treatment contact with a sheet carried by said sheet retentive platen in the operative position of said treatment means and a journalled shaft for said supply means having a manually operable handle and a sector gear, said supply means including a trough, a shaft journalled in said trough having a gear engaging with said sector gear, an actuator bar connected to said shaft journalled in said trough for movement of treatment materials in said trough, said treatment means including a trough journalling said rotatable means thereof and secured to said trough for said supply means, said supply means having a dispensing bar and means journalling said dispensing bar, said actuator bar actuating said dispensing bar to dispense materials from said through for said supply means into said trough for said treatment means.

19. In a processing system, treatment means and supply means, said treatment means including a trough with a rotatable member therein and means for rotating said rotatable member, said supply means including a trough connected to said trough for said treatment means and having a wall adjacent said treatment means, a shaft journalled in said trough for said supply means, a shaft journalled beneath said trough for said supply means, a handle on said shaft journalled beneath said trough for said supply means, a sector gear on said shaft journalled beneath said trough for said supply means, a gear meshing with said sector gear on the shaft journalled in the trough for said supply means, an actuator bar connected to said shaft in said trough for said supply means, said trough for said supply means having a dispensing bar and cam means journalling said dispensing bar therein, said actuator bar being effective to move materials in said trough for said supply means to said dispensing bar and to rotate said cam means and said dispensing bar to move materials from said trough for said supply means to said trough for said treatment means.

20. In a processing system, treatment means and supply means, said treatment means including a trough with a rotatable member therein and means for rotating said rotatable member, said supply means including a trough connected to said trough for said treatment means and having a wall adjacent said treatment means, a shaft journalled in said trough for said supply means, a shaft journalled beneath said trough for said supply means, a handle on said shaft journalled beneath said trough for said supply means, a sector gear on said shaft journalled beneath said trough for said supply means, a gear meshing with said sector gear on the shaft journalled in the trough for said supply means, an actuator bar connected to said shaft in said trough for said supply means, said trough for said supply means having a dispensing bar and cam means journalling said dispensing bar therein, said actuator bar being effective to move materials in said trough for said supply means to said dispensing bar and to rotate said cam means and said dispensing bar to move materials from said trough for said supply means to said trough for said treatment means, and spring means connecting said dispensing bar to said trough for said supply means to provide an over-center position for said dispensing bar such that when said dispensing bar is rotated out of said trough by said actuator bar to a predetermined angular extent, a snap action is produced on said dispensing bar to dispense materials with directed force into said trough for said treatment means.

21. In a processing system, treatment means and supply means, said treatment means including a trough with a rotatable member therein and means for rotating said rotatable member, said supply means including a trough connected to said trough for said treatment means and having a wall adjacent said treatment means, a shaft journalled in said trough for said supply means, a shaft journalled beneath said trough for said supply means, a handle on said shaft journalled beneath said trough for said supply means, a sector gear on said shaft journalled beneath said trough for said supply means, a gear meshing with said sector gear on the shaft journalled in the trough for said supply means, an actuator bar connected to said shaft in said trough for said supply means, said trough for said supply means having a dispensing bar and cam means journalling said dispensing bar therein, said actuator bar being effective to move materials in said trough for said supply means to said dispensing bar and to rotate said cam means and said dispensing bar to move materials from said trough for said supply means to said trough for said treatment means, and spring means connecting said dispensing bar to said trough for said supply means to provide an over-center position for said dispensing bar such that when said dispensing bar is rotated out of said trough by said actuator bar to a predetermined angular extent, a snap action is produced on said dispensing bar to dispense materials with directed force into said trough for said treatment means, said wall for said supply trough forming a limit position for said actuator bar within said trough for said supply means and a limit position for said actuator bar outside of said trough for said supply means.

22. A device for dispensing materials comprising a trough, a dispensing bar, means journalling said dispensing bar in said trough, a spring connecting said dispensing bar to said trough and means for moving said dispensing bar angularly upwardly out of said trough to dispense materials from said trough, said spring cooperating with said dispensing bar to provide an over-center position therefor such that when said dispensing bar is rotated angularly a predetermined distance out of said trough a snap action is produced on said dispensing bar to throw materials carried thereby outwardly of said trough with directional force.

23. A device for dispensing materials comprising a trough, a dispensing bar, means journalling said dispensing bar in said trough, a spring connecting said dispensing bar to said trough and means for moving said dispensing bar angularly upwardly out of said trough to dispense materials from said trough, said spring cooperating with said dispensing bar to provide an over-center position therefor such that when said dispensing bar is rotated angularly a predetermined distance out of said trough a snap action is produced on said dispensing bar to throw materials carried thereby outwardly of said trough with directional force and a treatment trough connected to said first mentioned trough in position to receive materials therefrom.

References Cited by the Examiner
UNITED STATES PATENTS

| | | | |
|---|---|---|---|
| 16,617 | 2/57 | Thomason | 222—361 X |
| 1,708,130 | 4/29 | Guest | 222—261 |
| 2,059,608 | 11/36 | Rochester | 222—361 |
| 2,210,567 | 8/40 | Carrol | 118—241 |
| 2,539,988 | 1/51 | Calles et al. | 118—241 |
| 2,847,066 | 8/58 | Kleiber et al. | 161—10 |
| 3,088,386 | 5/63 | Sugarman | 118—637 X |
| 3,098,765 | 7/63 | Keller et al. | 118—627 |

WILLIAM D. MARTIN, *Primary Examiner.*